United States Patent
Gorring

[15] 3,642,577
[45] Feb. 15, 1972

[54] GROWING HYDROCARBON-UTILIZING MICROORGANISMS

[72] Inventor: Robert L. Gorring, Princeton, N.J.
[73] Assignee: Mobil Oil Corporation
[22] Filed: Sept. 4, 1968
[21] Appl. No.: 757,286

[52] U.S. Cl. ..........................................195/28 R, 195/109
[51] Int. Cl. ......................................................C12d 13/06
[58] Field of Search ....................99/9, 14; 195/28, 109, 314, 195/142, 143

[56] References Cited

UNITED STATES PATENTS

| | | | |
|---|---|---|---|
| 2,188,192 | 1/1940 | Scholler | 195/94 |
| 2,697,062 | 12/1954 | Cramer | 195/3 |
| 3,427,223 | 2/1969 | Frankenfeld et al. | 195/1 |

*Primary Examiner*—A. Louis Monacell
*Assistant Examiner*—Roger B. Andewelt
*Attorney*—Oswald G. Hayes, Andrew L. Gaboriault and Mitchell G. Condos

[57] ABSTRACT

Hydrocarbon-utilizing micro-organisms are grown in increased yields by incubating them in a water-in-oil emulsion containing a hemochromogen wherein the oil is a hydrocarbon and the hemochromogen takes up and releases air thus presenting a greater amount of oxygen for utilization by the micro-organisms.

2 Claims, 2 Drawing Figures

INVENTOR
Robert L. Gorring

GROWING HYDROCARBON-UTILIZING MICROORGANISMS

BACKGROUND OF THE INVENTION

1. The field of the invention comprises a method for increasing the growth of hydrocarbon-using micro-organisms.

2. It is conventional to grow micro-organisms in a culture mixture comprising an oil-in-water emulsion, but so far as is known, they have not been grown in a water-in-oil emulsion.

SUMMARY OF THE INVENTION

The invention comprises a method for growing micro-organisms by incubating them in a culture mixture in the form of a water-in-oil emulsion where the oil is a hydrocarbon. The mixture is made up of aqueous mineral salt nutrient solution, a hydrocarbon as the sole source of carbon for energy and growth, and oxygen, and enough hydrocarbon is present to form a water-in-oil emulsion.

DESCRIPTION OF THE SPECIFIC EMBODIMENTS

Figures 1, 2:
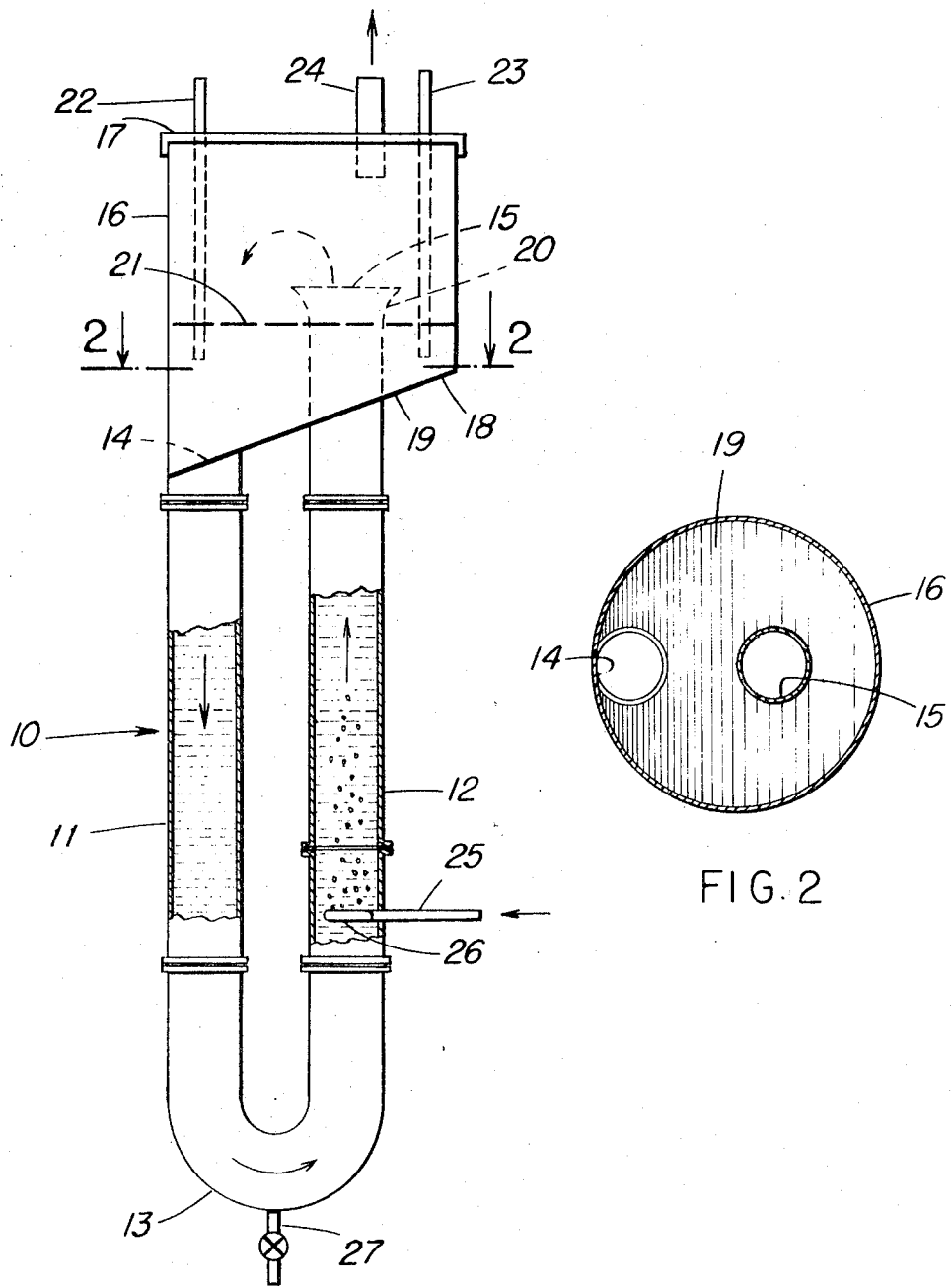

It should be noted, first of all, that growing micro-organisms is of interest because many of them are capable of synthesizing proteins and other useful materials. These proteins are suitable for use as or in food for cattle and other animals, including humans. Increasing the growth rate of the micro-organisms, therefore, means increasing the production of proteins.

The invention is applicable to any aerobic microbial species which is able to utilize a hydrocarbon as the sole source of carbon for energy and growth, including hydrocarbon-utilizing species of bacteria, fungi, yeasts, and molds. Nonfastidious organisms are preferred, i.e., those which will grow in simplified salts media without necessity for additions of organic compounds. Species which are active animal or human pathogens are excluded.

Of the bacteria, suitable genera include *Pseudomonas, Bacillus, Flavobacterium, Sarcina*, etc. Illustrative species of these genera are *P. aeruginosa, P. oleovorans, P. putida, P. boreopolis, P. methanica, P. fluorescens, P. pyocyanea; B. aureus, B. acidi, B subtilis, B. urici, B. cereus, B. coagulans, B. mycoides, B. circulans, B. megaterium; Flavobacterium aquatile; Sarcina alba, Sarcina luteum*.

Other preferred genera are *Achromobacter* and *Nocardia*, as illustrated by species such as *A. xerosis, A. agile, A. gutatus, A. superficialis, A. parvulus, A. cycloclastes; N. slamonicolor, N. asteroides, N. minimus, N. opaca, N. corallina, N. rubra*, and *N. paraffinae*. The genus *Mycobacterium* is useful, particularly such species as *M. parafficum, M. phlei, M lacticola, M. rhodochrous, M. smegmatis, M. rubrum, M. luteum, M. album, M. byalinicum*, and *M. leprae*.

Still other hydrocarbon-utilizing bacteria are *Methanomonas methanica* and *Methanomonas sp.; Micrococcus paraffinae; B. aliphaticum, B. hidium*, and *B. benzoli* from the genus *Bacterium;* and species of *Micromonospora*. Other useful genera include *Brevibacterium, Aerobacter*, and *Corynebacterium*.

Of the fungi, the method is applicable to any fungus within the classification Eumycetes or true fungi, but preferably those from the class Fungi Imperfecti or from the class Phycomycetes. Preferred fungi from the class *Fungi* Imperfecti are species of the genera *Aspergillus* and *Penicillium*, as illustrated by *A. niger, A. glaucus, A. oryzae, A. flavus, A. terreus, A. itaconicus; P. notatum, P. chrysogenum, P. glaucum, P. griseofulvum, P. expansum, P. digitatum, P. italicum*, etc. Other suitable organisms include various species of the genera *Monilia, Helminthosporium, Alternaria, Fusarium*, and *Myrothecium*. Preferred fungi of the class Phycomycetes include species from the genera *Rhizopus and Mucor*, such as *R. nigricans, R. oryzae, R. delemar, R. arrhizus, R. stolonifer, R. sp.; M. mucedo, M. genevensis*.

Some of the foregoing genera of fungi are also characterized as molds, such as *Aspergillus, Penicillium, Rhizopus*, and *Mucor*, but it will be understood that all are true fungi or Eumycetes.

Of the yeasts, the preferred organisms are of the family Cryptococcaceae, and particularly of the subfamily Cryptococcoidae. Preferred genera are *Torulopsis*(or *Torula*) and *Candida*. Preferred species are *Candida lipolytica, Candida pulcherrima, Candida utilis, Candida utilis Variati major, Candida tropicalis, Candida intermedia*, and *Torulopsis colliculosa*. Other useful species are *Hansenula anomala, Oidium lactia*, and *Neurospora sitophila*.

The hydrocarbon is one that is in the liquid phase at incubation temperature so as to be able to form a water-in-oil emulsion. Aliphatic hydrocarbons are preferred, and these may be saturated or unsaturated, straight or branched chain hydrocarbons having up to 20 or 30 or 40 or more carbon atoms. Saturated straight-chain hydrocarbons having up to 20 carbons are particularly desirable. Cyclic hydrocarbons, comprising aromatic and alicyclic compounds, are also of use, including alkyl-substituted cyclic compounds having one, two, or more alkyl substituents each of any suitable length, chain configuration, and degree of saturation, and in which the cyclic moiety is aromatic or cycloparaffinic. Alkyl-substituted aromatic hydrocarbons include toluene, the various xylenes, mesitylene, ethylbenzene, p-cymene, the diethylbenzenes, and the isomeric propylbenzenes, butylbenzenes, amylbenzenes, heptylbenzenes, and octylbenzenes. Among the useful alkyl-substituted cycloparaffins are methylcylcopentane, the di- and trimethylcyclopentanes, ethylcyclopentane, the diethylcyclopentanes, the various propyl-, butyl-, amyl-, hexyl-, and octylcyclopentanes. Also the alkylcyclohexanes, which are substituted in a manner corresponding to the foregoing alkylcyclopentanes, and further including such compounds as the various tetramethylcyclohexanes, methylethylcyclohexanes, methylpropylcyclohexanes, and the like.

Crude oils, various petroleum fractions, residua, etc., are of use.

It will be appreciated that the hydrocarbon may be in the liquid phase not only by having a suitable melting point but also by being dissolved in a suitable solvent. The hydrocarbons contemplated in the preceding paragraphs are those which are normally liquid at incubation temperature. However, other useful hydrocarbons are those which are normally gaseous at incubation temperature. However, other useful hydrocarbons are those which are normally gaseous at incubation temperature, such as methane, ethane, propane, butane, and other C3 to C5 hydrocarbons. These gaseous hydrocarbons may be dissolved in a normally liquid hydrocarbon, such as a petroleum fraction in the gasoline or kerosene boiling range, or in an alkanelike octane, nonane, decane, etc.; or they may be dissolved in any other conventional solvent therefor which is inert in the process and nontoxic to the cells. Also, normally solid hydrocarbons may be used as the source of carbon by dissolving them in a hydrocarbon solvent, in the manner described, or in any other conventional inert nontoxic solvent.

The aqueous mineral salt nutrient comprises a source of nitrogen such as nitrate or nitrite or ammonium salt or urea, and such ions as potassium, magnesium, phosphate, and sulfate, as well as ions of trace elements like molybdenum, cobalt, etc. Traces of manganese, iron, and calcium may be present. As water is included in the nutrient, most of these ions will usually be present in sufficient quantity in ordinary potable water supplies. However, it is desirable to add the ions to the nutrient to insure their presence in sufficient quantity for growth. Usually the nutrient consists primarily of water, which may constitute 99 percent, or more, by weight of the nutrient, although it may also constitute a lesser portion, going down to 50 percent thereof. Generally any proportion of water heretofore employed in microbial growth may be used. A suitable mineral salts nutrient may be listed as follows, the components being dissolved in enough water to make 1 liter of solution:

TABLE 1

| | |
|---|---|
| Potassium monohydrogen phosphate | 6.0 g. |
| Sodium dihydrogen phosphate | 9.0 |
| Sodium molybdate | 0.006 |
| Cobaltic chloride | 0.006 |
| Magnesium sulfate | 0.6 |
| Ammonium sulfate | 6.0 |

Another suitable mineral salts nutrient is as follows:

TABLE 2

| | |
|---|---|
| Sodium monohydrogen phosphate | 9 g. |
| POtassium dihydrogen phosphate | 6 |
| Ammonium sulfate | 6 |
| Magnesium sulfate | 0.6 |
| Sodium carbonate | 0.3 |
| Calcium chloride | 0.03 |
| Ferrous sulfate | 0.015 |
| Manganese sulfate | 0.006 |
| Cobalt chloride | 0.006 |
| Sodium molybdate | 0.006 |

The method generally comprises incubating the micro-organism in the mineral nutrient in the presence of the hydrocarbon and oxygen. During incubation, the culture mixture is maintained under conditions to insure optimum growth of the micro-organism. The temperature for example should be maintained between about 20° and about 55° C., preferably from 20° to 40° C. The pH is maintained near neutrality, namely, about 7.0, although it may range between about 5.5 and 8.5. The mixture is maintained in a condition of agitation as by shaking, or by using propellers, paddles, rockers, stirrers, or other means ordinarily employed for effecting agitation of a liquid mixture. Also included is agitation produced by circulating air in the mixture after introducing the same thereto by means of a sparger.

The proportions of the aqueous mineral nutrient (which includes water and dissolved salts) are such as to provide the water-in-oil emulsion, the hydrocarbon forming the continuous phase. The emulsion is preferably formed and maintained by agitation of the culture mixture, and suitably may comprise at least 66 percent, and going up to 80 or 90 percent or more, of hydrocarbon, the balance being aqueous mineral nutrient, volume basis. According to this preferred method of forming the emulsion, one or more emulsifying agents are present, either being produced in the culture mixture during the fermentation, or being added per se. Emulsifying agents added per se may be of ionic or nonionic character, it being understood that they are suitable to promote a water-in-oil emulsion. A water-in-oil emulsion may be formed and maintained at lower hydrocarbon proportions, extending from about 66 percent down to 35 or 40 percent, balance aqueous mineral nutrient, volume basis, and at these proportions it is preferred to add one or more emulsifying agents per se of the kind described. Some illustrative agents include oleates and stearates like sorbitan sesquioleate, sorbitan monooleate, sorbitan monostearate, polyoxyethylene oxypropylene glucoside oleate, etc. Preferably the agents have an HLB (Hydrophile-Lipophile Balance) of about 3 to 6. (Numerical HLB values are explained in a publication of Atlas Chemical Co. entitled "Atlas Surfactants," where they are shown to range from about 1 to 30, with the lower values indicating a more lipophilic material and the higher values indicating a more hydrophilic material.) Agents of suitable HLB value may also be obtained by blending two or more other agents. The useful agents are used in conventional amounts, and preferably they are edible or nontoxic.

The emulsion may be conveniently formed within the fermentor, although it is also feasible to prepare it by means of a conventional homogenizer and then add it to the fermentor.

The fermentor may be open to the atmosphere, and with agitation of the mixture, the surface thereof exposed to the atmosphere is continuously renewed and oxygen is taken up from the atmosphere. It is preferred, however, to keep the fermentor closed and to supply oxygen by bubbling air through the mixture, thereby also providing desired agitation.

In connection with the supply of oxygen to the fermentor, upon which the cell growth rate depends, the invention provides a marked advantage over conventional cell production using a culture mixture comprising an oil-in-water emulsion. In the conventional method, oxygen is transferred from air bubbles through the continuous aqueous phase of the oil-in-water emulsion to the growing cells disposed in such phase, and this transfer rate is dependent on the solubility of oxygen in the aqueous phase. At 37° C., a conventional incubation temperature, the solubility of oxygen in the aqueous phase, under equilibrium conditions, is about 6 p.p.m. In the present method, oxygen is transferred from the air bubbles through the continuous hydrocarbon phase of the water-in-oil emulsion at a rate, under equilibrium conditions, corresponding to its solubility in such phase, which ranges from 60 to 100 p.p.m., and from the hydrocarbon phase the oxygen is transferred to the cells in the dispersed aqueous phase. It will thus be seen that the transfer rate through the continuous hydrocarbon phase is 10 to 16 times greater than that through the continuous aqueous phase; and the cell growth rate in the water-in-oil emulsion is greater than that in the oil-in-water emulsion by at least an order of magnitude.

A particularly suitable method for growing cells in the water-in-oil emulsion, while supplying air in amounts adequate not only for growth but also to provide agitation, is shown in connection with the apparatus diagrammatically illustrated in FIGS. 1 and 2, the latter figure being a section along the line 2—2 of FIG. 1. The method involves an airlift operation carried out in a U-shaped device 10 comprising a pair of columns 11, 12 each connected at the bottom by a U-bend 13 and each open at the top. The open tops 14, 15 are enclosed within a cylindrical portion 16 having a cover 17 over its open upper end. The lower end 18 of cylinder 16 is cut at a slant and closed off by the slanting wall 19. The upper end of column 11 is also cut at a slant, and the opening 14 therein lies in the plane of the slanted wall 19. Thus, liquid in cylinder 16 drains through such open end 14 into column 11. Column 12 extends into cylinder 16 for some distance, terminating in a flared end portion 20. In normal operation, liquid fills cylinder 16 to a level as indicated at 21, and into such liquid there extend a pH-indicating control 22 and a temperature-indicating device 23. A vent at 24 allows gases to pass out.

The columns 11 and 12 are constructed of sections, as shown, although any other suitable construction may be employed. Between each adjacent pair of sections there are provided watertight gaskets. An air inlet tube 25 conducts air from a source not shown to a sparger device 26 located below the middle of column 12. At 27 is a valved drain tube for removing samples.

While various materials may be used in the construction of the device, suitably the columns may be of glass, the cylinder of metal, the cover of transparent material, and the gaskets of Teflon plastic.

The device may be operated by removing cover 17 and charging into the flared end 20 of column 12, in desired proportions, the aqueous mineral nutrient and the hydrocarbon. Enough material is added to fill column 11, column 12 to the level indicated at 21, and the cylinder 16 to said level. A micro-organism is also present, being added to the material either before or after charging of the same to the device. Air is passed into column 12 through the sparger at a desired rate, this being at least sufficient to move the liquid upwardly in column 12, over the top 15 thereof, and into the lower portion of cylinder 16. A flow is thus created, note the arrows, with liquid in column 11 moving over into column 12, and liquid in the cylinder descending by gravity into column 11. The speed of this flow may be estimated visually and controlled by adjusting the air rate.

The culture mixture in the device may be heated in any suitable way, as by inserting an electrically heated rod or other device (not shown) into the liquid in cylinder 16, or in any other desired way. Automatic temperature control means, of conventional kind, may be used to maintain a constant temperature. Control over pH is provided by the instrument 22, and if necessary, suitable adjustments are made from time to time by appropriate addition of an alkaline or an acid material. Air collecting in cylinder 16 is vented through line 24 along with any other gases.

It will be apparent that the airstream introduced through line 25 not only brings oxygen into the system but also provides for the agitation of the mixture and its movement from one column to the other. Such agitation and movement make for good contact between the cells and the other components of the mixture. A typical airflow rate is 0.1 cu. ft. per minute per liter of liquid at standard conditions, although the rate may be increased to 5, 10 or more times this value or decreased to 20 or 10 percent, or less, of such value.

Operation of the foregoing method may be on a batch or a continuous basis. In the former, the initial charge of culture mixture is maintained throughout, there being no additions and, except for test samples, no withdrawals. In the latter, additions and withdrawals are made, either continuously or intermittently, throughout the course of a run.

In a batch run, circulation of the mixture between columns 11 and 12 may be carried on as long as desired, but usually it is brought to a halt when there is no further increase in cell growth. Growth may be followed by removing test samples of the mixture from time to time through line 27 and analyzing the same as by means of optical density measurements, as described below in Example 1. When it is decided to stop the fermentation, the airflow and the heat input are shut off, and the mixture is drained from the system through line 27 to a settling tank where separation of phases is brought about by allowing the mixture to stand, although other separation means may be employed. One of the advantages of the invention is that phase separation, as brought about by standing, can be achieved almost spontaneously, or in a matter of seconds, and generally in less than a minute. The oil phase rises to the top of the settling tank, is removed, and held for reuse in another run. The aqueous phase, in which the cells collect, is subjected to a suitable separation step, such as filtration, centrifugation, settling, etc., whereby the cells are recovered. The resulting used aqueous mineral nutrient may, if desired, be worked up to recover any chemical values, and if this is not feasible or desired, it may be discarded, or if justified it may be reused.

Cell yields of up to 20 g./l. of culture mixture, or more, are obtainable. By comparison, a yield of no more than about 5 g./l. is obtainable using a culture mixture in the form of an oil-in-water emulsion.

In a continuous run the procedures used in a batch run are applicable except that additions of hydrocarbon and aqueous mineral nutrient, and withdrawals of culture mixture, are made throughout the course of the run either on an intermittent or a continuous basis. These additions and withdrawals are balanced not only to maintain the quantity or level of culture mixture in the apparatus but also to maintain the condition of the emulsion, i.e., as a water-in-oil emulsion of substantially constant composition. The withdrawn culture mixture may be continuously separated into phases, the oil phase reused as by recycling, and the cells removed and recovered from the aqueous phase. Used aqueous phase may be reused as is, or it may first be reconstituted by addition of mineral salts and then reused; or, if its condition is deemed unsuitable, it may be purified by removing toxic products or it may be discarded. If desired, some of the product cells may be recycled, either before or after separation from the aqueous phase, as such recycling may provide some stimulation for further growth. The withdrawals and additions may be initiated at any desired time, either at the point of maximum concentration or growth of the cells or at some earlier point; preferably they are initiated at a point subsequent to the start of the fermentation. The point of maximum growth may easily be established as by plotting a graph of variance between cell concentration and time of run. An advantage of a continuous run is to provide a continuous yield of cells from a given apparatus. Another advantage is that toxic products, i.e., products toxic to the cells, which tend to collect in the aqueous phase, may be continuously removed from the system.

It is feasible to add to the culture mixture a substance which takes up and releases oxygen, preferably one that is superior in this respect than the hydrocarbon. Such substance or compound can then take up oxygen from the introduced air and at some subsequent point in the flow of the culture mixture release at least a part of the oxygen to the cells. In this way a greater amount of oxygen may be presented to the cells for utilization by them. A compound of interest for this purpose is hemoglobin, a water-soluble material comprising a complex of an iron-containing pigment portion, called heme or hemin, with a protein called globin. Hemoglobin has the ability to combine loosely with molecular oxygen, forming oxyhemoglobin, but the union is loose and can be dissociated under relatively simple conditions, such as a change of partial pressure of oxygen or of pH, forming oxygen and reduced hemoglobin. Thus, the hemoglobin can pick up oxygen in a region of higher oxygen partial pressure and release it in a region of lower oxygen partial pressure. Such regions may be identified in the apparatus of FIG. 1, the former being adjacent and just above the introduced air in column 12 and the latter being more remote from such airstream as in column 11.

The hemoglobin complex may be separated into heme and globin. The heme is capable of combining with various other proteins, like albumin, and with bases like pyridine, nicotine, ammonia, etc., yielding hemopyridine, hemonicotine, etc. Collectively such compounds are called hemochromogens. They react with oxygen similarly to hemoglobin, and are of similar use. It may be noted that hemoglobin itself is a hemochromogen. Hemoglobin is found in the blood of all vertebrates. Heme is even more widely distributed in nature and may be used to form a complex with a desired nitrogen-containing base or a protein.

The invention may be illustrated by the following examples.

EXAMPLE 1

In a batch run, a culture mixture was prepared comprising 6.5 liters n-hexadecane, 3.0 liters of fresh aqueous mineral nutrient of the composition set forth in Table 1, and 250 mg. *Brevi-bacterium sp.* The mixture had a pH of 7.0. It was charged to an airlift fermentor, of the type illustrated, of about 10 liters capacity, heated to 36° C., and air bubbled through at a rate of about 1.8 cu. ft./min. As growth took place, the pH of the mixture fell to 6.0, at which point it was maintained by addition of ammonium hydroxide. Distilled water and n-hexadecane were added periodically to replace losses by evaporation.

The concentration of the cells was measured periodically by means of optical density determinations made on total or complete samples of culture mixture. One cc. of fermentor sample was diluted in 8 to 10 cc. of 2-propanol, centrifuged, then redispersed in water in preparation for a density measurement. Centrifugation of each sample showed the liquid phase of the same to be composed of about ⅔ oil and ⅓ water or aqueous medium. Staining with a water-soluble dye (Nigrosin) revealed that the liquid phase was a water-in-oil emulsion.

At all cell concentrations it was found that the aqueous phase of the withdrawn samples was able to separate from the hydrocarbon phase in about 20 seconds, a phenomenon not observable in the case of a culture mixture comprising an oil-in-water emulsion. Owing to this rapid separation of phases, a foam-free aqueous phase was formed which contained most of the cells; and over it was a hydrocarbon phase. After about 10 minutes, a distinct settling-separation of the cells in the aqueous phase was noticed, with no dispersed oil droplets present. Optical density was measured by testing samples of culture mixture for the adsorption of visible light rays of a wavelength of 400 millimicrons (0.4 micron) in a Bausch and Lomb colorimeter. The following table shows the increase in cell growth at periodic intervals throughout the run.

TABLE 3

| Time of Run, hr. | Cell concn. g./l. | Time of Run, hr. | Cell concn. g./l. |
| --- | --- | --- | --- |
| 1 | 0.15 | 11 | 5.9 |
| 2 | 0.25 | 12 | 7.1 |
| 3 | 0.35 | 13 | 7.8 |
| 4 | 0.5 | 14 | 7.95 |
| 5 | 0.65 | 15 | 8.05 |
| 6 | 0.9 | 16 | 8.1 |
| 7 | 1.3 | 17 | 8.15 |
| 8 | 2.2 | 18 | 8.25 |
| 9 | 3.3 | 19 | 8.3 |
| 10 | 4.3 | 20 | 8.3 |
|  |  | 25 | 8.4 |

It is apparent that cell growth increased continuously throughout the run. Starting at about the 7th hour and continuing to about the 13th hour, the increased growth was sharp, the concentration increasing from 1.3 to 7.8 g./l. If the data is plotted to give a concentration-vs.-time curve, it will be seen that this sharp increase corresponds to an almost vertical portion of the curve. From the 13th to the 25th hours, growth levelled off but was still continuous. A high of 8.4 g./l. was reached.

EXAMPLE 2

In another run carried out in substantially the same manner as in the preceding example, the yield of cells reached a maximum of about 20 g./l. It is felt that in this run contamination of the culture mixture by toxic products was probably less a factor than in the preceding run.

It will be understood that the invention is capable of obvious variations without departing from its scope.

In the light of the foregoing description, the following is claimed.

1. Method for increasing the growth of cells of a hydrocarbon-utilizing micro-organism comprising incubating said micro-organism in a mixture comprising an aqueous mineral salt solution and a hydrocarbon as the sole source of carbon for energy and growth of said micro-organism, forming said mixture into a water-in-oil emulsion where the oil is said hydrocarbon, introducing an oxygen-containing gas into said mixture, introducing a hemochromogen into said mixture, growing said cells in said mixture, then separating said mixture into an oil phase and an aqueous phase containing most of said cells, and recovering said cells from said aqueous phases.

2. Method for increasing the growth of cells of a hydrocarbon-utilizing micro-organism which comprises incubating said micro-organism in a mixture comprising an aqueous mineral salt solution and a hydrocarbon as the sole source of carbon for energy and growth of said micro-organism, said hydrocarbon comprising at least 35 percent by volume of said mixture so that the latter forms a water-in-oil emulsion, introducing an oxygen-containing gas into said mixture, introducing a hemochromogen into said mixture, growing said cells in said mixture, then separating said mixture into an oil phase and an aqueous phase containing said cells, recovering said cells from said aqueous phase, and in this way producing a larger yield of said cells than in a like method which however employs said mixture in the form of an oil-in-water emulsion.

* * * * *

UNITED STATES PATENT OFFICE
CERTIFICATE OF CORRECTION

Patent No. 3,642,577              Dated February 15, 1972

Inventor(s) Robert L. Gorring

It is certified that error appears in the above-identified patent and that said Letters Patent are hereby corrected as shown below:

On the title page, under list of attorneys, add the name --Frederick E. Dumoulin--.

Column 1, line 46, "N. slamonicolor" should be --N. salmonicolor--.

Column 3, Table 2, first line, "9 g." should be --9 g. 1.--.

Column 8, last line of claim 1, "phases" should be --phase--.

Signed and sealed this 18th day of July 1972.

(SEAL)
Attest:

EDWARD M. FLETCHER, JR.
Attesting Officer

ROBERT GOTTSCHALK
Commissioner of Patents